April 11, 1961  F. T. NEVES  2,979,082
IRRIGATION WATER DISTRIBUTING DEVICE
Filed Jan. 4, 1957  2 Sheets-Sheet 1

INVENTOR.
FRANK T. NEVES
BY
McMorrow, Berman & Davidson
ATTORNEYS

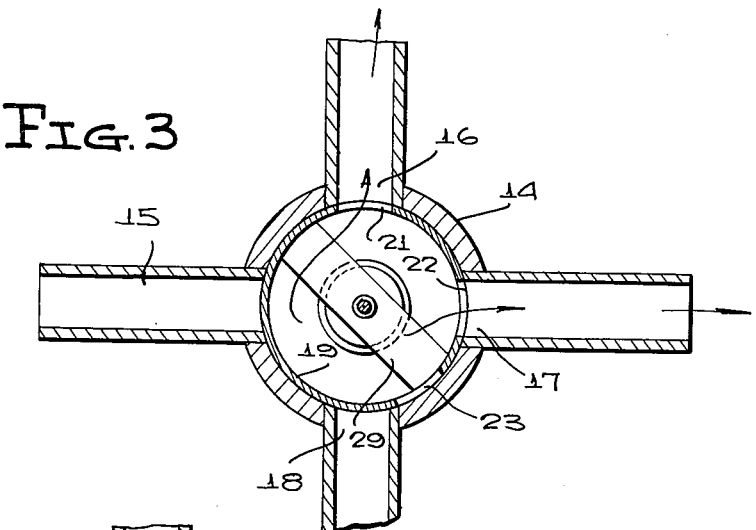
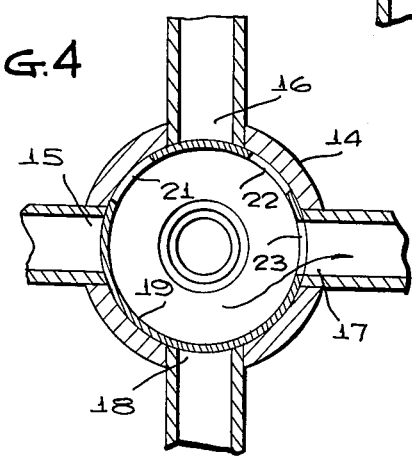
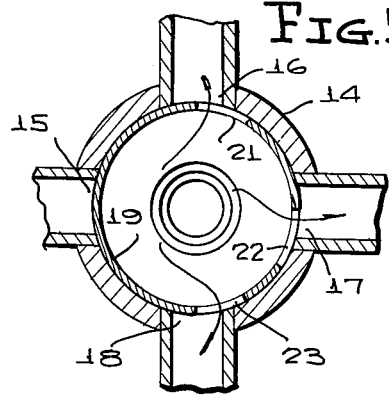
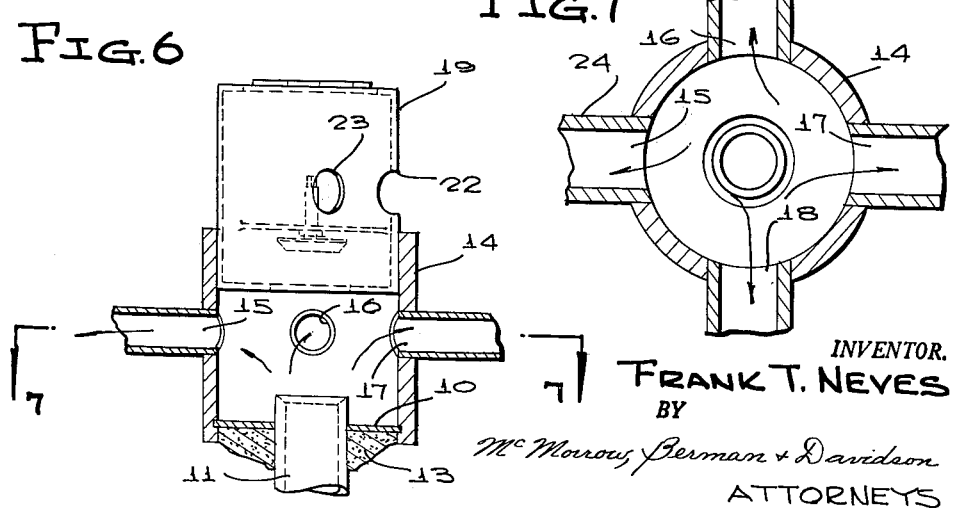
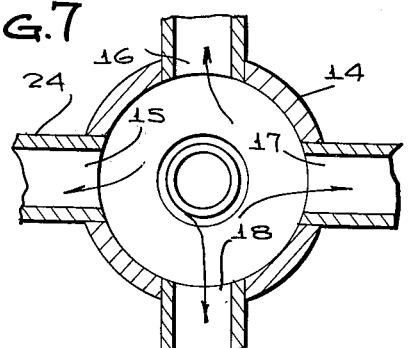

United States Patent Office 2,979,082
Patented Apr. 11, 1961

2,979,082

IRRIGATION WATER DISTRIBUTING DEVICE

Frank T. Neves, 38191 Highway 99, Kingsburg, Calif.

Filed Jan. 4, 1957, Ser. No. 632,606

5 Claims. (Cl. 137—625.11)

The present invention relates to an irrigation water distributing device or gate for directing irrigation water into one or more ditches.

An object of the present invention is to provide a water distributing device which enables the user to direct the flow of irrigation water into one, two, three, or four irrigation ditches or channels, one which lends itself for use in orchards where the water is generally confined in shallow trenches running between the trees and also one which lends itself for use in sodded areas such as hay or alfalfa fields where the water is permitted to flow directly over the sod.

Another object of the present invention is to provide a water distributing device which is sturdy in construction and of relatively long life, one which is easily manufactured and assembled, and one which is economically feasible.

These and other objects and advantages of the present invention will be fully apparent from the following description, when taken in connection with the annexed drawings, in which:

Figure 3 is a sectional view, taken on the line 3—3 of Figure 2, showing the device in the position directing the water flow into two conduits;

Figure 4 is a view similar to Figure 3, showing the device adjusted so that the water flow is through only one conduit;

Figure 5 is a similar view showing the water partially flowing into three conduits;

Figure 6 is a sectional view similar to Figure 2, the dotted line showing indicating the upwardly raised position of the sleeve of the present invention, permitting the water to flow through all four conduits; and Figure 7 is a sectional view taken on the line 7—7 of Figure 6.

Figure 1:
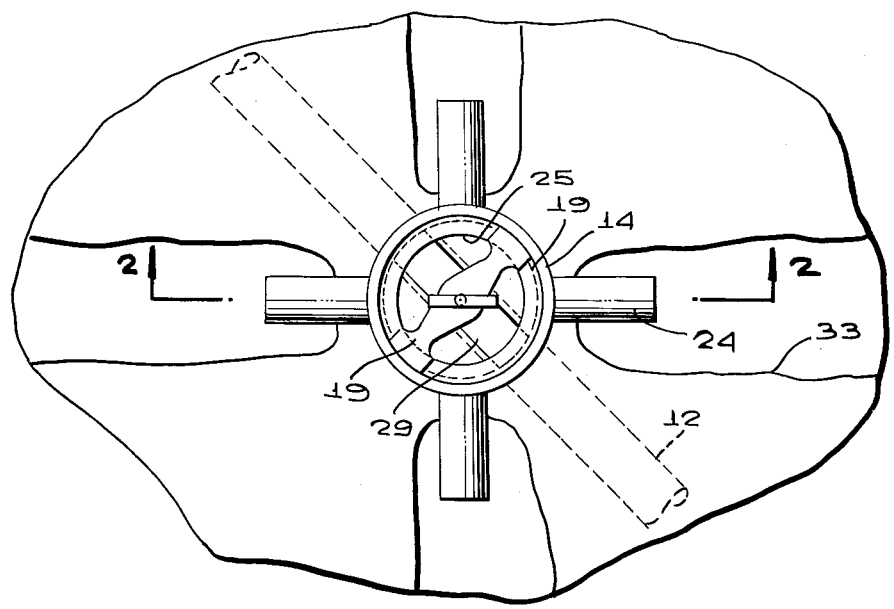
Figure 1 is a top plan view of the water distributing device, according to the present invention, the dotted line showing indicating an underground irrigation supply pipe.

Referring in greater detail to the drawings in which like numerals indicate like parts throughout the several views, the water distribution device, according to the present invention, comprises a horizontally disposed support plate 10 surrounding and spaced below the open end of an upright irrigation discharge conduit 11, the latter having its lower end connected in communication with a horizontally extending irrigation water supply pipe 12. The conduit 11 and the support plate 10 are fixed together by a mass of cementitious material as at 13, sealing the support plate about the conduit 11.

An upstanding hollow open ended casing 14 is positioned so that the lower end receives the support plate 10 with the open upper end spaced above and parallel to the support plate 10, the lower end of the casing 14 being in seal-tight secured relation with respect to the support plate 10.

The casing 14 is provided with a plurality of discharge orifices, four in number, and designated by the reference numerals 15, 16, 17 and 18, arranged in spaced relation therearound intermediate the upper and lower ends of the casing 14.

A sleeve 19 is positioned within the casing 14 and is insertable and withdrawable through the upper open end of the casing 14. The sleeve 19 is of a size to fit snugly within the casing 14 in frictional engagement with the inner wall of the casing 14 and is rotatable within the casing 14. The sleeve 19 has discharge ports 21, 22, and 23, arranged in spaced relation thereabout and registrable with the orifices 15 through 18, inclusive, as shown in Figures 3 through 5, inclusive, in any desired combination. In Figure 3, orifices 15 and 18 are closed by the sleeve 19, while the port 21 and the port 22 are in communication with the orifices 16 and 17, respectively. In Figure 4, orifices 15, 16, and 18 are closed by the sleeve 19 and only the single port 23 is in communication with the orifice 17. In Figure 5, orifice 15 is still closed by the sleeve 19, while the orifices 16, 17, and 18 are partially connected in communication with the ports 21, 22, and 23, respectively. In Figure 6, the sleeve 19 is shown in a raised position with respect to the casing 14, permitting the water to flow upwardly from the conduit 11 into the interior of the casing 14 and thence outwardly through all the orifices 15, 16, 17, and 18, each of the orifices being connected in communication with a horizontally disposed dispensing conduit 24 which projects from the casing 14 exteriorly thereof and has one end fixedly secured in the respective one of the orifices 15 to 18, inclusive.

The significant relation between the orifices 15 through 18 and the ports 21 through 23 can best be observed by reference to Figs. 3, 4, and 5. It will be noted that the orifices are equally spaced circumferentially of the casing and are of a width measured circumferentially of the casing less than the distance of their spacing. Expressed differently, the orifices provide adjacent edges spaced a distance greater than the width of the orifices. Of the ports, the adjacent pair designated at 21 and 22 are spaced a distance substantially equal to the spacing of the orifices. The pair of ports 22 and 23 are more closely spaced by an amount equal to approximately the width of an orifice. When so spaced, rotation of the sleeve 19 in a clockwise direction, as viewed in Fig. 5, serves progressively to increase the registration of the port 23 with the orifice 18 while progressively decreasing the registration of the port 22 with the orifice 17 and at a corresponding rate. It will be evident that an equivalent structure and operation is also attainable by spacing the ports 22 and 23 farther apart than the spacing of the orifices by an amount equal to approximately the width of an orifice. Thus the significant feature with respect to the spacing of these two ports is that they are either closer or farther apart, in other words spaced differently from the spacing of the orifices, an amount equal to approximately the width of an orifice. It will be noted in Fig. 3 that the centers of the ports 21 and 22 are spaced a distance equal to the spacing of the orifices 17 and 18, and the spacing of the centers of all other adjacent orifices, and that the spacing of the centers of the ports 22 and 23 is substantially equal to the distance between the adjacent edges of the orifices 17 and 18. It will also be apparent in view of the foregoing that the centers of the ports 22 and 23 may be spaced a distance substantially equal to the distance between the oppositely disposed edges of the orifices 17 and 18 to attain an equivalent structure and mode of operation.

Figure 2:
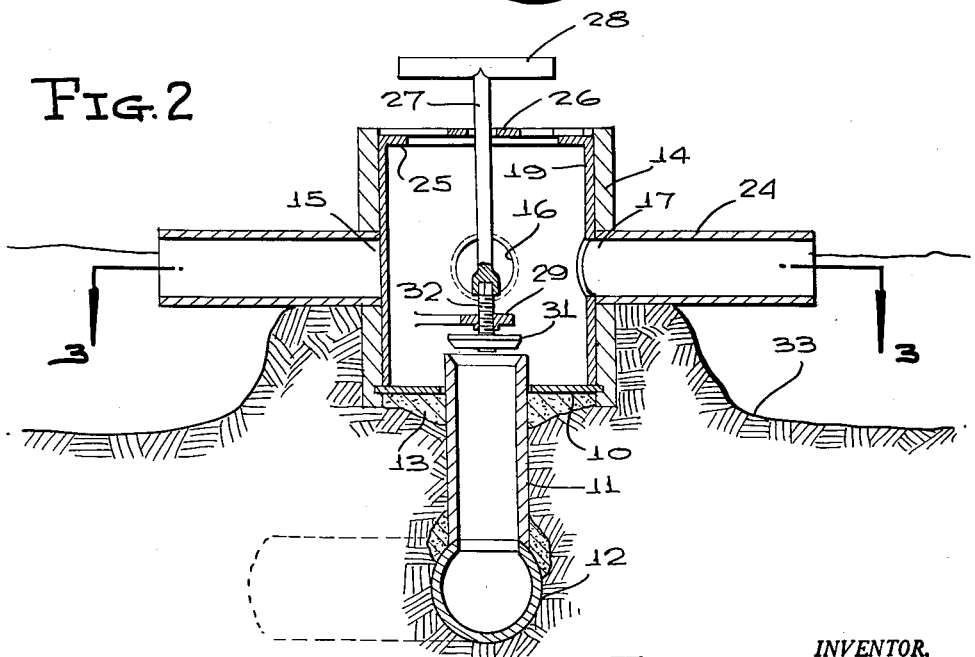
Figure 2 is a sectional view, on an enlarged scale, taken on the line 2—2 of Figure 1.

The sleeve 19 is formed at its upper end with an inwardly turned flange 25 to which is secured a diametrically positioned bridge element 26 having an aperture therethrough for the insertion of the shank 27 of a valve wrench 28. Another bridge element 29 (Figures 2 and 3) extends diametrically across the sleeve 19 intermediate the ends of the latter therein and upwardly from the lower end and at a right angle to the bridge element 26.

An openable and closable valve 31 is carried by the bridge element 29 within the sleeve 19 and is seatable upon the open upper end of the conduit 11. The valve stem 32 of the valve 31 extends upwardly through a threaded aperture provided in the bridge element 29 and has the portion adjacent its upper end conformably shaped to fit the open lower end of the valve wrench 28, thus enabling the user thereof to open and close the valve 31 to control the flow of water from the conduit 11 into the interior of the sleeve 19 and thence outwardly through any selected one of the discharge pipes or conduits 24 upon proper rotation of the sleeve 19 within the casing 14.

As shown in Figure 1, the conduits 24 each permit the flow of water into shallow trenches or ditches 33 when it is desired to contain the irrigation water within a specific area, such as in an orchard. The conduits 24 may be dispensed with when it is desired to merely flood a sodded area such as a hay or alfalfa field, the water issuing from the orifices 15 to 18, inclusive, flowing directly onto the sodded area without damage thereto.

What is claimed is:

1. In an irrigation device, the combination of a tubular substantially upright casing having an open upper end, a lower end adapted for connection to a source of irrigating water, and four laterally disposed orifices substantially equally spaced about the casing, the casing having a cavity defined by an inwardly disposed surface of revolution concentric to an erect axis; a sleeve having an external surface of revolution rotatably fitted in the cavity against the internal surface of the casing and providing three laterally disposed ports therein of substantially the same size and shape as the orifices, adjacent first and second of said ports being spaced substantially the same distance as the orifices in the casing and adjacent second and third ports being spaced a distance different from the spacing of the orifices by an amount equal to substantially the width of an orifice measured circumferentially of the casing; means in the lower end of the casing defining a valve seat concentric to the sleeve circumscribing a water receiving opening; bridge elements mounted in the upper and lower ends of the sleeve; a valve adapted for sealing engagement with the valve seat having an operating stem screw-threadably mounted axially concentrically of the sleeve in the bridge element of the lower end of the sleeve; and a valve wrench rotatably mounted axially concentrically of the sleeve in the bridge element of the upper end of the sleeve in releasably driven connection to the stem of the valve, the sleeve being frictionally engaged in the casing and with the bridge elements, valve and wrench mounted therein being movable into and out of the open upper end of the casing.

2. A valve structure for use in an irrigation system having a water supply pipe and a tubular casing connected to the pipe and upwardly extended therefrom and in which said casing provides an open upper end and has a set of laterally disposed openings constituting orifices, comprising a sleeve rotatably fitted in the upper end of the casing and movable axially to and from the casing through said open upper end, said sleeve having a laterally disposed opening constituting a port selectively registerable with the orifices of the casing upon rotation of the sleeve in the casing; and means connected to the sleeve for rotatably positioning the sleeve in the casing selectively to register the port with the orifices of the casing and for moving the sleeve axially to and from the casing to cover and uncover the orifices of the casing.

3. The valve structure of claim 2 in which the sleeve positioning means comprises a bridge element integral with the sleeve and extended diametrically of the upper end thereof.

4. In an irrigation system having a water supply pipe and an upstanding tubular casing connected to the pipe and upwardly extended therefrom and in which said casing provides an open upper end and a set of laterally disposed openings constituting orifices; the combination of a sleeve frictionally fitted in the upper end of the casing movable axially to and from the casing in and out of the open upper end thereof, and rotatable within the casing, said sleeve having a laterally disposed opening constituting a port selectively registerable with the orifices of the casing upon rotation of the sleeve in the casing; means in the casing defining an upwardly disposed valve seat concentric to the sleeve circumscribing a water supply opening; a valve adapted for engagement with the valve seat in sealing relation to the opening; and means borne concentrically of the sleeve mounting the valve on the sleeve for adjustable movement axially thereof to and from seat engagement when the sleeve is positioned in the upper end of the casing and movable integrally with the sleeve to and from the casing.

5. In an irrigation system having a supply pipe, and an upstanding tubular casing connected to the pipe providing an open upper end, a lower end, and having a set of laterally disposed openings constituting orifices spaced circumferentially of the casing; the combination of a sleeve fitted in the upper end of the casing, movable axially to and from the casing, and rotatable within the casing, said sleeve having a set of openings constituting laterally disposed ports registerable with the orifices of the casing upon rotation of the sleeve in the casing; means in the lower end of the casing defining an upwardly disposed valve seat concentric to the sleeve circumscribing a water supply opening; upper and lower bridge elements mounted in the sleeve and extended diametrically of the sleeve; a valve stem screw-threadably mounted in the lower bridge element axially concentric to the sleeve and having upper and lower ends; a valve adapted for engagement with the valve seat in sealing relation to the supply opening mounted on the lower end of the stem; and a valve wrench rotatably and slidably mounted in the upper bridge element axially concentric to the sleeve having a lower end engageable with the upper end of the stem in driving relation thereto, said stem, bridge elements, and wrench being movable to and from the casing integrally with the sleeve.

References Cited in the file of this patent

UNITED STATES PATENTS

| | | |
|---|---|---|
| 481,943 | Gustin | Sept. 6, 1892 |
| 935,566 | Twiford | Sept. 28, 1909 |
| 1,036,674 | Meurling | Aug. 27, 1912 |
| 1,310,954 | Moller | July 22, 1919 |
| 2,362,747 | Duke | Nov. 14, 1944 |
| 2,612,341 | Bridgefield | Sept. 30, 1952 |
| 2,617,622 | White et al. | Nov. 11, 1952 |
| 2,625,909 | Steely | Jan. 20, 1953 |
| 2,698,120 | Fairchild | Dec. 28, 1954 |

FOREIGN PATENTS

| | | |
|---|---|---|
| 12,372 | Great Britain | May 30, 1903 |
| 1,103,769 | France | June 1, 1955 |